(12) United States Patent
Hertgers

(10) Patent No.: US 10,337,762 B2
(45) Date of Patent: Jul. 2, 2019

(54) HEAT EXCHANGER AND HEAT SOURCE DEVICE

(71) Applicant: RINNAI CORPORATION, Nagoya-shi, Aichi (JP)

(72) Inventor: Christiaan Hendrik Hertgers, Almen (NL)

(73) Assignee: RINNAI CORPORATION, Nagoya-Shi (JP)

( * ) Notice: Subject to any disclaimer, the term of this patent is extended or adjusted under 35 U.S.C. 154(b) by 0 days.

(21) Appl. No.: 15/719,767

(22) Filed: Sep. 29, 2017

(65) Prior Publication Data
US 2018/0094831 A1 Apr. 5, 2018

(30) Foreign Application Priority Data
Oct. 4, 2016 (JP) .................................. 2016-196178

(51) Int. Cl.
| | |
|---|---|
| F28D 9/00 | (2006.01) |
| F28F 3/00 | (2006.01) |
| F24H 1/14 | (2006.01) |
| F24H 9/14 | (2006.01) |
| F24H 8/00 | (2006.01) |
| F24H 1/38 | (2006.01) |

(Continued)

(52) U.S. Cl.
CPC ............... *F24H 1/145* (2013.01); *F24H 1/38* (2013.01); *F24H 1/52* (2013.01); *F24H 8/00* (2013.01); *F24H 9/148* (2013.01); *F28D 9/0043* (2013.01); *F28D 9/0093* (2013.01); *F28D 21/0007* (2013.01); *Y02B 30/102* (2013.01)

(58) Field of Classification Search
CPC ........ F28D 7/0066; F28D 9/00; F28D 9/0093; F28D 20/025; F28D 20/026; F28F 3/005
See application file for complete search history.

(56) References Cited

U.S. PATENT DOCUMENTS

| | | | | |
|---|---|---|---|---|
| 9,891,002 | B2* | 2/2018 | Shedd | ..................... G06F 1/206 |
| 2016/0377320 | A1* | 12/2016 | Kim | ......................... F24H 8/00 |
| | | | | 165/140 |
| 2018/0195739 | A1* | 7/2018 | Kawachi | ............... F28F 9/0246 |

FOREIGN PATENT DOCUMENTS

| | | |
|---|---|---|
| JP | 2010-101524 | 5/2010 |
| WO | 2005/071343 A1 | 8/2005 |

(Continued)

OTHER PUBLICATIONS

European Search Report dated Jan. 29, 2018, 8 pages.

*Primary Examiner* — Gregory A Wilson
(74) *Attorney, Agent, or Firm* — Rankin, Hill & Clark LLP

(57) ABSTRACT

A heat exchanger for hot water supply (21) is comprised of: a first heat exchanging unit (21)a that heats the water, which is supplied from a second communication section $x_1$ to the hollow portions of hollow plates $P_1$ to $P_5$ and reaches a first communication section y, by a combustion exhaust gas that circulates through the gaps among the hollow plates $P_1$ to $P_5$; and a second heat exchanging unit (21b) that heats the water, which is supplied from the first communication section y to the hollow portions of the hollow plates $P_6$ to $P_8$ below the hollow plates $P_1$ to $P_5$ and reaches a third communication section $x_2$, by a heat medium that circulates through the gaps among the hollow plates $P_6$ to $P_8$.

3 Claims, 3 Drawing Sheets

(51) Int. Cl.
*F24H 1/52* (2006.01)
*F28D 21/00* (2006.01)

(56) References Cited

FOREIGN PATENT DOCUMENTS

| WO | 2007/083862 A1 | 7/2007 |
| WO | 2015/139946 A1 | 9/2015 |
| WO | 2015/142003 A1 | 9/2015 |

* cited by examiner

HEAT EXCHANGER AND HEAT SOURCE DEVICE

BACKGROUND OF THE INVENTION

Field of the Invention

The present invention relates to a heat exchanger adapted to heat a liquid and a heat source device that uses the heat exchanger.

Description of the Related Art

Hitherto, there has been known a hot water supply apparatus adapted to heat the water for hot water supply by a combustion exhaust gas discharged from a boiler and then to heat the water for hot water supply to a set temperature by liquid-liquid heat exchange with a heating heat medium that has been heated by the boiler.

For example, the hot water supply apparatus described in Japanese Patent Application Laid-Open No. 2010-101524 (Patent Document 1) includes a circulation circuit for circulating a heat medium (hot water), which is circulated between the apparatus and a heating terminal, while performing heat-exchange heating by the combustion heat of a combustion burner in a main heat exchanger. The apparatus further includes a first auxiliary heat exchanger, which uses the hot water that has been heat-exchange heated as the heat source thereof, and a second auxiliary heat exchanger, which recovers the latent heat from the combustion exhaust gas that has passed through the main heat exchanger, as separate heating sources for a hot water supply circuit.

Further, the water supplied from a water supply passage is first passed through the second auxiliary heat exchanger to preheat the water by the recovered latent heat and then passed through the first auxiliary heat exchanger to heat the preheated water by the liquid-liquid heat exchange with the hot water of the circulation circuit, and the heated hot water is supplied (paragraph 0006 of Patent Document 1 and FIG. 3).

However, according to the foregoing hot water supply apparatus, the first auxiliary heat exchanger and the second auxiliary heat exchanger are placed apart (refer to FIG. 3), so that there has been a disadvantage in that more heat tends to dissipate from the hot water circulating through the water passage from the second auxiliary heat exchanger to the first auxiliary heat exchanger.

SUMMARY OF THE INVENTION

The present invention has been made in view of the background described above, and it is an object of the present invention to provide a heat exchanger capable of reducing the heat dissipation of hot water circulating among a plurality of heat exchanging units.

A heat exchanger according to the present invention includes: a plurality of hollow plates having hollow portions inside respectively, and stacked in parallel with predetermined gaps provided thereamong; a first communication section in communication with the hollow portions of the plurality of hollow plates; a second communication section in communication with the hollow portions of a predetermined number of hollow plates from a topmost hollow plate among the plurality of hollow plates; and a third communication section in communication with the hollow portions of hollow plates that are below the predetermined number of hollow plates among the plurality of hollow plates, wherein a part composed of the predetermined number of hollow plates from the topmost hollow plate, the first communication section, and the second communication section constitutes a first heat exchanging unit which heats a first fluid, which is supplied from the second communication section to the hollow portions of the predetermined number of hollow plates and which reaches the first communication section, by a second fluid which circulates through the gaps among the predetermined number of hollow plates, and a part composed of the hollow plates below the predetermined number of hollow plates, the first communication section, and the third communication section constitutes a second heat exchanging unit which heats a first fluid, which is supplied from the first communication section to the hollow portions of the hollow plates below the predetermined number of hollow plates and which reaches the third communication section, by a third fluid which circulates through the gaps among the hollow plates below the predetermined number of hollow plates (a first aspect of the invention).

The first heat exchanging unit of the heat exchanger according to the first aspect of the invention is configured by stacking the predetermined number of the hollow plates with the predetermined gaps provided thereamong, and the second fluid circulates through the gaps of the hollow plates. With this arrangement, the first fluid circulating through the hollow portions of the hollow plates is preliminarily heated by the heat exchange with the second fluid.

Meanwhile, the second heat exchanging unit of the heat exchanger is configured by stacking the hollow plates below the hollow plates of the first heat exchanging unit with the predetermined gaps provided thereamong. In the second heat exchanging unit, the third fluid circulates through the gaps among the hollow plates. With this arrangement, the first fluid circulating through the hollow portions of the hollow plates is further heated by the heat exchange with the third fluid, so that the first fluid can be efficiently heated.

In the heat exchanger according to the first aspect of the invention, the plurality of hollow plates are rectangular, the first communication section is provided on a first side surface side of the plurality of hollow plates, and the second communication section and the third communication section are provided on a second side surface side that opposes the first side surface (a second aspect of the invention).

According to the configuration, the flow passage of the first heat exchanging unit composed of the plurality of hollow plates and the flow passage of the second heat exchanging unit composed of the plurality of hollow plates are formed in continuity by being folded back by the first communication section adjacent to the first side surface. This enables the two heat exchanging units to be closer to each other, thus making it possible to reduce the heat dissipation of the first fluid, which has been preliminarily heated, in the flow passage from the first heat exchanging unit to the second heat exchanging unit.

Further, the heat exchanger according to the first aspect of the invention includes: a first fluid inlet for the first fluid, the first fluid inlet being in communication with the hollow portions of the hollow plates constituting the first heat exchanging unit; a first fluid outlet for the first fluid, the first fluid outlet being in communication with the hollow portions of the hollow plates constituting the second heat exchanging unit; and a third fluid inlet and a third fluid outlet for the third fluid, which are in communication with the flow passage among the hollow plates constituting the second heat exchanging unit, wherein the first fluid inlet, the first fluid outlet, the third fluid inlet, and the third fluid outlet are provided such that the directions of connection thereof are the same (a third aspect of the invention).

With this arrangement, the first fluid inlet and the first fluid outlet for the first fluid, which is heated by the heat exchanger, and the third fluid inlet and the third fluid outlet for the third fluid of the heat exchanger are all connected in the same direction, thus making it easy to assemble the heat exchanger to a constituent member of a heat source device.

Further, the heat exchanger according to the second aspect of the invention may include: a first fluid inlet for the first fluid, the first fluid inlet being in communication with the hollow portions of the hollow plates constituting the first heat exchanging unit; a first fluid outlet for the first fluid, the first fluid outlet being in communication with the hollow portions of the hollow plates constituting the second heat exchanging unit; and a third fluid inlet and a third fluid outlet for the third fluid, which are in communication with the flow passage among the hollow plates constituting the second heat exchanging unit, wherein the first fluid inlet, the first fluid outlet, the third fluid inlet, and the third fluid outlet may be provided, all having the same direction of connection.

Further, the heat exchanger according to the first aspect of the invention further includes a junction section at which a bottommost hollow plate constituting the first heat exchanging unit and a topmost hollow plate constituting the second heat exchanging unit are joined by brazing (a fourth aspect of the invention).

According to the configuration, the bottommost hollow plate constituting the first heat exchanging unit and the topmost hollow plate constituting the second heat exchanging unit are joined by brazing. This makes it possible to directly join the two heat exchanging units without using a joining component, thus enabling the two heat exchanging units to be combined into one unit in a compact manner.

The heat exchanger according to the second aspect of the invention may further include a junction section at which a bottommost hollow plate constituting the first heat exchanging unit and a topmost hollow plate constituting the second heat exchanging unit are joined by brazing.

Further, the heat exchanger according to the third aspect of the invention may further include a junction section at which a bottommost hollow plate constituting the first heat exchanging unit and a topmost hollow plate constituting the second heat exchanging unit are joined by brazing.

A heat source device in accordance with the present invention includes: a burner; an exhaust passage through which a combustion exhaust gas of the burner is discharged; a heat medium passage through which a heat medium circulates; a heat medium heat exchanger which is provided in communication with the heat medium passage in the exhaust passage and which heats a heat medium circulating through the heat medium passage by the combustion exhaust gas of the burner; a hot water supply passage through which water circulates; and a hot water supply heat exchanger which has a first heat exchanging unit, which is provided in communication with the hot water supply passage in the exhaust passage on a downstream side in relation to the heat medium heat exchanger and which heats water circulating through the hot water supply passage by the combustion exhaust gas of the burner, and a second heat exchanging unit, which is provided in communication with the heat medium passage and the hot water supply passage and which heats the water circulating through the hot water supply passage by a heat medium circulating through the heat medium passage.

Further, the hot water supply heat exchanger has: a plurality of hollow plates having hollow portions inside respectively, and stacked in parallel with predetermined gaps provided thereamong; a first communication section in communication with the hollow portions of the plurality of hollow plates; a second communication section in communication with the hollow portions of a predetermined number of hollow plates from a topmost hollow plate among the plurality of hollow plates; and a third communication section in communication with the hollow portions of hollow plates below the predetermined number of hollow plates among the plurality of hollow plates, wherein the first heat exchanging unit is composed of the predetermined number of hollow plates from the topmost hollow plate, the first communication section, and the second communication section, the second heat exchanging unit is composed of the hollow plates below the predetermined number of hollow plates, the first communication section, and the third communication section, and a part of the outer shell of the exhaust passage is composed of a top surface, a side surface, or a bottom surface of a hollow plate constituting the first heat exchanging unit (a fifth aspect of the invention).

The heat source device according to the fifth aspect of the invention is provided with the configuration of the heat exchanger according to the present invention described above, so that the same operational advantage is obtained. Further, in the heat source device, the combustion exhaust gas of the burner passes through the exhaust passage and is discharged out of the heat source device. The first heat exchanging unit of the hot water supply heat exchanger is provided in the exhaust passage, so that the water circulating through the hot water passage is heated by the combustion exhaust gas.

Further, a part of the outer shell of the exhaust passage is composed of a top surface, a side surface, or a bottom surface of a hollow plate constituting the first heat exchanging unit. Water flows along the hollow plate (e.g. the top surface thereof) of the first heat exchanging unit, the hollow plate serving as the hot water supply passage, so that the hollow plate does not become extremely hot, thus making it possible to suppress a rise in the temperatures of components disposed on the outer side of the exhaust passage.

In the heat source device according to the fifth aspect of the invention, the plurality of hollow plates are rectangular, the first communication section is provided adjacently to a first side surface of the plurality of hollow plates, and the second communication section and the third communication section are provided adjacently to a second side surface opposing the first side surface (a sixth aspect of the invention).

According to the configuration, the flow passage of the first heat exchanging unit composed of the plurality of hollow plates and the flow passage of the second heat exchanging unit composed of the plurality of hollow plates are formed in continuity by being folded back by the first communication section adjacent to the first side surface. This enables the two heat exchanging units to be closer to each other, thus making it possible to reduce the heat dissipation of the water, which has been preliminarily heated, in the flow passage from the first heat exchanging unit to the second heat exchanging unit.

Further, in the heat source device according to the fifth aspect of the invention, the hollow plates constituting the first heat exchanging unit are placed in the heat source device in a raised manner (a seventh aspect of the invention).

According to the configuration, the hollow plates constituting the first heat exchanging unit are placed in a raised manner in the heat source device, thus causing the combustion exhaust gas to circulate among the hollow plates in a substantially vertical direction. Therefore, even if the combustion exhaust gas condenses, condensed water will flow down among the hollow plates. This makes it possible to suppress an increase in the exhaust resistance attributable to stagnant condensed water.

Further, in the heat source device according to the sixth aspect of the invention, the hollow plates constituting the first heat exchanging unit may be placed in a raised manner in the heat source device.

DESCRIPTION OF THE PREFERRED EMBODIMENTS

Figure 1:
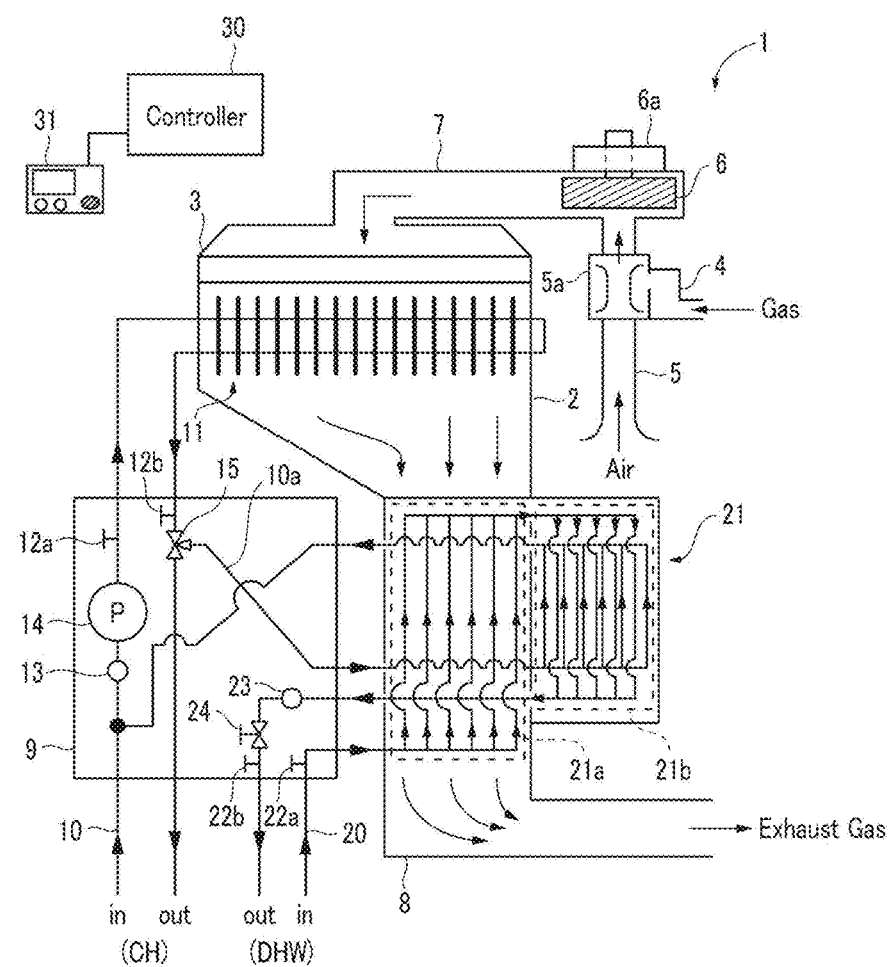
FIG. 1 is a configuration diagram of a combined boiler provided with a heat exchanger in accordance with the present invention.

An embodiment example of the present invention will be described with reference to FIG. 1 to FIG. 3. First, FIG. 1 illustrates the configuration of a combined boiler 1 provided with a heat exchanger in accordance with the present invention.

The combined boiler 1 has two systems, namely, a system that generates and supplies hot water for heating and a system that generates and supplies hot water for supplying hot water. The combined boiler 1 is a type called FF type (forced draught balanced flue type) adapted to take in air for combustion from outdoors and discharge the combustion exhaust gas produced from combustion to outdoors.

The combined boiler 1 mainly includes a combustion chamber 2, a burner 3, a first hot water passage 10 for heating, a heat exchanger for heating 11 which raises the temperature of water (corresponding to "a third fluid" in the present invention) circulating through the first hot water passage 10 by the combustion exhaust of the burner 3 to turn the water into hot water, a second hot water passage 20 for supplying hot water, a heat exchanger for hot water supply 21 which raises the temperature of water (corresponding to "a first fluid" in the present invention) of the second hot water passage 20 by the heat exchange with the combustion exhaust gas (corresponding to "a second fluid" in the present invention) of the burner 3 and the heat exchange with the hot water circulating through the first hot water passage 10 thereby to turn the water into hot water, and a controller 30 which controls primarily the combustion amount of the burner 3.

The combustion chamber 2 is located in the main body housing of the combined boiler 1. The main body housing is substantially hermetically sealed. Further, the heat exchanger for heating 11 is disposed in the combustion chamber 2.

As illustrated in FIG. 1, the burner 3 is provided at the top of the combustion chamber 2. Further, a gas supply pipe 4, through which a fuel gas is supplied, and an air supply pipe 5, through which combustion air is supplied, are connected to an air-fuel mixture passage 7 via a mixing section 5a.

The fuel gas and the combustion air are mixed in the mixing section 5a and then supplied to the combustion chamber 2 through the air-fuel mixture passage 7. More specifically, the air-fuel mixture of the fuel gas and the combustion air is circulated by a fan 6 through the air-fuel mixture passage 7 and supplied to the burner 3. The fan 6, which is, for example, a turbofan, uses a motor 6a to draw in a gas and discharge the gas from the circumference by rotating a cylindrical vane. Then, the air-fuel mixture is ignited by an igniter (not illustrated) in the combustion chamber 2 through an ignition plug, and the air-fuel mixture burns.

The hot combustion exhaust gas generated by the combustion of the burner 3 is passed through an exhaust passage 8, which is provided at the bottom of the combustion chamber 2, and discharged from the main body housing. Further, a gas-liquid heat exchanging unit 21a of the heat exchanger for hot water supply 21 is disposed in the exhaust passage 8. The water circulating through the second hot water passage 20 is heated by the latent heat of the combustion exhaust gas that passes through the gaps among the hollow plates constituting the gas-liquid heat exchanging unit 21a, the details of which will be discussed hereinafter.

The first hot water passage 10 (corresponding to "a heat medium passage" in the present invention) is a water passage for heating (central heating (CH)), which is heated by the heat exchanger for heating 11. The water (hereinafter referred to as "the water for heating") enters from the water inlet of the first hot water passage 10 and soon reaches a water passage section 9.

Provided in the water passage section 9 are a water supply thermistor 12a, which detects the temperature (inflow water temperature) of the water for heating that flows into the heat exchanger for heating 11, a flow rate sensor 13, which detects the flow rate of the water for heating, and a pump 14. In addition, a hot water supply thermistor 12b, which detects the temperature (outflow hot water temperature) of the water for heating that has been heated by the heat exchanger for heating 11, and a three-way valve 15, which switches the water passage are provided.

The water for heating that has passed through the water passage section 9 is heated by the heat exchanger for heating 11 (corresponding to "a heat medium heat exchanger" in the present invention) and then moved toward a water outlet. Further, in the first hot water passage 10, the three-way valve 15 on the downstream side of the heat exchanger for heating 11 switches the flowing direction of the water for heating produced in the heat exchanger for heating 11 to the water outlet of the first hot water passage 10 or toward the heat exchanger for hot water supply 21.

When the three-way valve 15 is switched by the controller 30, the water for heating in the first hot water passage 10 circulates toward the heat exchanger for hot water supply 21. More specifically, if the first hot water passage 10 is switched by the three-way valve 15 to a heat medium supply passage 10a on the heat exchanger for hot water supply 21 side while the pump 14 is in operation, then the water for heating, the temperature of which has been increased by the heat exchanger for heating 11, performs heat exchange with the water circulating through the second hot water passage 20 in a liquid-liquid heat exchanging unit 21b of the heat exchanger for hot water supply 21. Thereafter, the water for heating returns to the first hot water passage 10. The three-way valve 15 may be a distribution valve that distributes the flow rate of the water for heating.

The second hot water passage 20 (corresponding to "a hot water supply passage" in the present invention) is a water passage for hot water supply (domestic hot water (DHW)), which is heated by the heat exchanger for hot water supply 21. The water (hereinafter referred to as "the water for hot water supply") enters from the water inlet of the second hot water passage 20 and soon reaches the water passage section 9.

In the water passage section 9, a water supply thermistor 22a and a hot water supply thermistor 22b are provided in the vicinity of the inlet and the outlet, respectively, of the second hot water passage 20. Further, a flow rate sensor 23 and a water volume servo valve 24 are provided on the downstream side of the heat exchanger for hot water supply 21. The water volume servo valve 24 is an electrically operated opening/closing variable valve for adjusting the flow rate of the second hot water passage 20.

The water for hot water supply that has passed through the water passage section 9 is heated by the heat exchanger for hot water supply 21 (corresponding to "a hot water supply heat exchanger" in the present invention). The heat exchanger for hot water supply 21 is composed of the gas-liquid heat exchanging unit 21a and the liquid-liquid heat exchanging unit 21b.

The water for hot water supply is first passed through the gas-liquid heat exchanging unit 21a (corresponding to "a first heat exchanging unit" in the present invention) to be preliminarily heated by the combustion exhaust gas of the burner 3, the details of which will be discussed hereinafter. Thereafter, the preliminarily heated water for hot water supply enters the liquid-liquid heat exchanging unit 21b (corresponding to "a second heat exchanging unit" in the present invention).

In the liquid-liquid heat exchanging unit 21b, the water for hot water supply is heated by the heat exchange with the water for heating generated by the heat exchanger for heating 11 described above. The gas-liquid heat exchanging unit 21a and the liquid-liquid heat exchanging unit 21b are adjacently disposed, thus permitting a reduction in the heat dissipation of the water for hot water supply in the water passage from the gas-liquid heat exchanging unit 21a to the liquid-liquid heat exchanging unit 21b.

Lastly, the controller 30, which is composed of electronic circuits, such as a CPU, a RUM and a RAM, controls the combustion amount of the burner 3 on the basis of the control setting made by a remote control 31. Further, the controller 30 controls the operations of the fan 6, the pump 14, and the three-way valve 15.

Figure 2A:
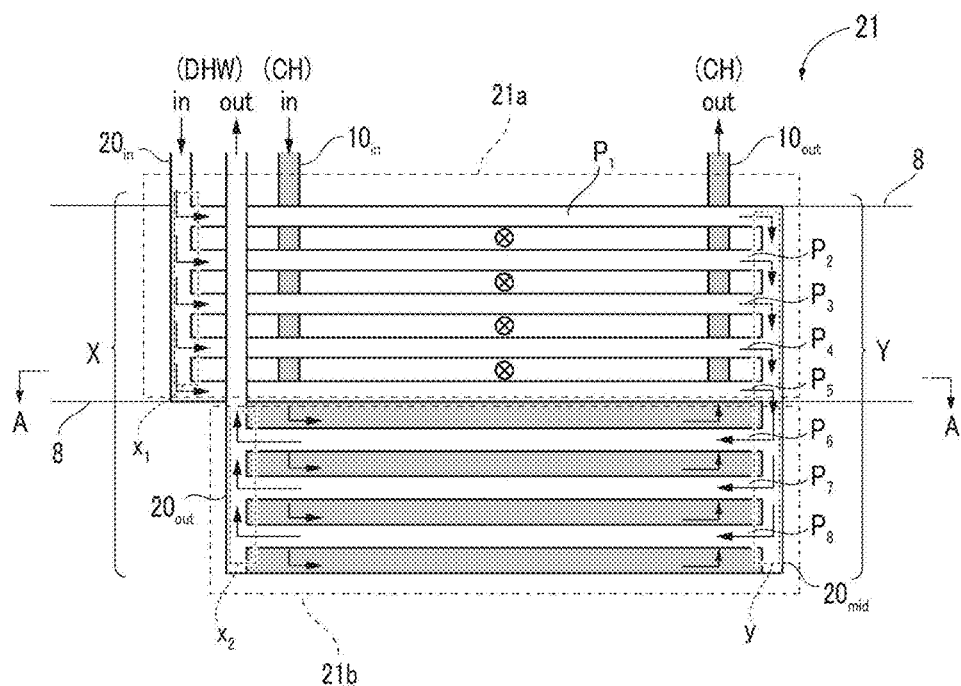
FIG. 2A is an explanatory diagram illustrating the details of a hot water supply heat exchanger (combined type)
Figure 2B:
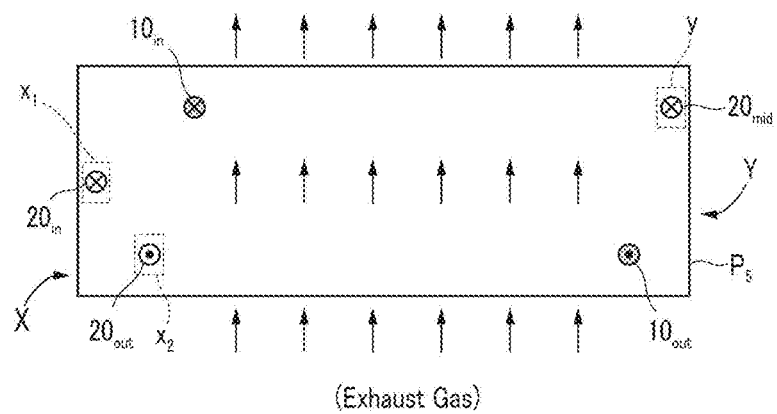
FIG. 2B is a sectional view taken on line A-A of the hot water supply heat exchanger in FIG. 2A.

Referring now to FIG. 2A and FIG. 2B, the heat exchanger for hot water supply 21 constituting the combined boiler 1 will be described in detail.

As illustrated in FIG. 2A, in the heat exchanger for hot water supply 21, the liquid-liquid heat exchanging unit 21b is disposed adjacently to the gas-liquid heat exchanging unit 21a such that the water for hot water supply passes through the gas-liquid heat exchanging unit 21a and then reaches the liquid-liquid heat exchanging unit 21b.

Both the gas-liquid heat exchanging unit 21a and the liquid-liquid heat exchanging unit 21b have a structure in which a plurality of rectangular hollow plates are stacked in parallel in the same orientation with predetermined intervals provided thereamong. The water for hot water supply first enters from a water inlet (corresponding to "a first fluid inlet" in the present invention) on a wall surface X side (corresponding to "a second side surface" in the present invention) of the gas-liquid heat exchanging unit 21a, passes through a water passage $20_{in}$ and enters into hollow plates $P_1$ to $P_5$ constituting the gas-liquid heat exchanging unit 21a.

The water passage $20_{in}$, which has the water inlet, is a communication section $x_1$ in communication with the hollow portions of the hollow plates $P_1$ to $P_5$, and corresponds to "a second communication section" in the present invention. The number of the hollow plates constituting the gas-liquid heat exchanging unit 21a is not limited to five.

Thereafter, the water for hot water supply that circulates through the hollow portions of the hollow plates $P_1$ to $P_5$ advances toward a wall surface Y (corresponding to "a first side surface" in the present invention) on the right side in the drawing. The hot combustion exhaust gas circulates through the gaps among the hollow plates $P_1$ to $P_5$, so that the water for hot water supply in the hollow portions is preliminarily heated by the heat exchange with the combustion exhaust gas. Thereafter, the water for hot water supply enters into the liquid-liquid heat exchanging unit 21b. A water passage $20_{mid}$ along the wall surface Y is a communication section y, which is in communication with the hollow plates $P_1$ to $P_5$ and which corresponds to "a first communication section" in the present invention.

Referring to FIG. 2A, the topmost hollow plate $P_1$ (top surface) and the bottommost hollow plate $P_5$ (bottom surface) of the gas-liquid heat exchanging unit 21a constitute a part of the outer shell of the exhaust passage 8. The water for hot water supply that has been preliminarily heated circulates through the hollow portions of the hollow plate $P_1$ and the hollow plate $P_5$, so that the outer sides of these two hollow plates will not become extremely hot, thus making it possible to suppress a temperature rise of the components in the vicinity thereof. Depending on the shape of the exhaust passage 8, the side surface (the water passages $20_{in}$ and $20_{mid}$) of the gas-liquid heat exchanging unit 21a may become a part of the outer shell of the exhaust passage 8.

The water for hot water supply that has reached the liquid-liquid heat exchanging unit 21b circulates through the hollow portions of the hollow plates $P_6$ to $P_8$ disposed below the hollow plates $P_1$ to $P_5$ and returns toward the wall surface X. Thus, the water passage of the gas-liquid heat exchanging unit 21a and the water passage of the liquid-liquid heat exchanging unit 21b are formed in continuity by being folded back at the water passage $20_{mid}$. This makes it possible to reduce the size of the heat exchanger for hot water supply 21 and to reduce the heat dissipation of the water for hot water supply, which moves between the two heat exchangers.

Further, the heat medium, which is the water for heating, circulates through the gaps among the hollow plates $P_6$ to $P_8$, so that the water for hot water supply in the hollow portions is fully heated by the heat exchange with the heat medium when the water for hot water supply returns toward the wall surface X.

As illustrated in FIG. 2A, water passages $10_{in}$ to $10_{out}$ for heat medium (the heat medium supply passage 10a in FIG. 1) are provided among the hollow plates $P_6$ to $P_8$ constituting the liquid-liquid heat exchanger 21b such that the water passages $10_{in}$ to $10_{out}$ are in contact with the hollow plates $P_6$ to $P_8$. With this arrangement, the liquid-liquid heat exchanging unit 21b provides higher heat exchange efficiency than the gas-liquid heat exchanging unit 21a.

Thereafter, the water for hot water supply in the hollow portions of the hollow plates $P_6$ to $P_8$ enters into a water passage $20_{out}$, which has a water outlet on the wall surface X side (corresponding to "a first fluid outlet" in the present invention), and is discharged out of the heat exchanger for hot water supply 21. The water passage $20_{out}$ is a communication section $x_2$ in communication with the hollow plates $P_6$ to $P_8$ and corresponds to "a third communication section" in the present invention.

The inlet (corresponding to "a third fluid inlet" in the present invention) and the outlet (corresponding to "a third fluid outlet" in the present invention) of the water passage $10_{in}$ for heat medium and the water inlet of the water passage $20_{in}$ and the water outlet of the water passage $20_{out}$ of the heat exchanger for hot water supply 21 are provided such that the directions of connection thereof are all the same. This enables the heat exchanger for hot water supply 21 to be easily assembled to the water passage section 9.

FIG. 2B is a sectional view taken on line A-A of the heat exchanger for hot water supply 21 illustrated in FIG. 2A. In FIG. 2B, the rectangular part is the hollow plate $P_5$ constituting the gas-liquid heat exchanging unit 21a.

There is the communication section $x_1$ on the wall surface X side of the hollow plate $P_5$, and the water passage $20_{in}$ of the water for hot water supply that is directed vertically downward is located in the communication section $x_1$. Further, there is the communication section $x_2$ located closer to the center in relation to the water passage $20_{in}$ on the wall surface X side, and the water passage $20_{out}$ for hot water supply that is directed vertically upward is located in the communication section $x_2$. Further, the water passage $10_{in}$ for heat medium, which is directed vertically downward, is located closer to the center in relation to the water passage $20_{out}$ on the wall surface X side.

Meanwhile, the communication section y is located on the wall surface Y side of the hollow plate $P_5$, and the water passage $20_{mid}$ for the water for hot water supply, which is directed vertically downward, is located in the communication section y. Further, the water passage $10_{out}$ for heat medium, which is directed vertically upward, is located closer to the center in relation to the water passage $20_{mid}$ on the wall surface Y side.

The combustion exhaust gas passes along the upper surface the hollow plate $P_5$, especially in the vicinity of the center where there are no water passages or flow passages for heat medium described above (upward in FIG. 2B). The exhaust passage 8 in the combined boiler 1 is provided with the hollow plates $P_1$ to $P_5$, which are substantially vertically raised. With this arrangement, even if the combustion exhaust gas condenses due to the contact with the hollow plates $P_1$ to $P_5$, the condensed water will flow down among the hollow plates, thus making it possible to suppress an increase in the exhaust resistance attributable to stagnant condensed water.

Lastly, referring to FIG. 3, a detailed description will be given of a heat exchanger for hot water supply 40, which is the foregoing heat exchanger for hot water supply 21 that has been turned into a separate type. The configuration of the heat exchanger for hot water supply 40 is the same as that of the heat exchanger for hot water supply 21 except that the two heat exchanging units are separated, so that the same reference numerals will be used and the detailed descriptions will be omitted.

Figure 3:
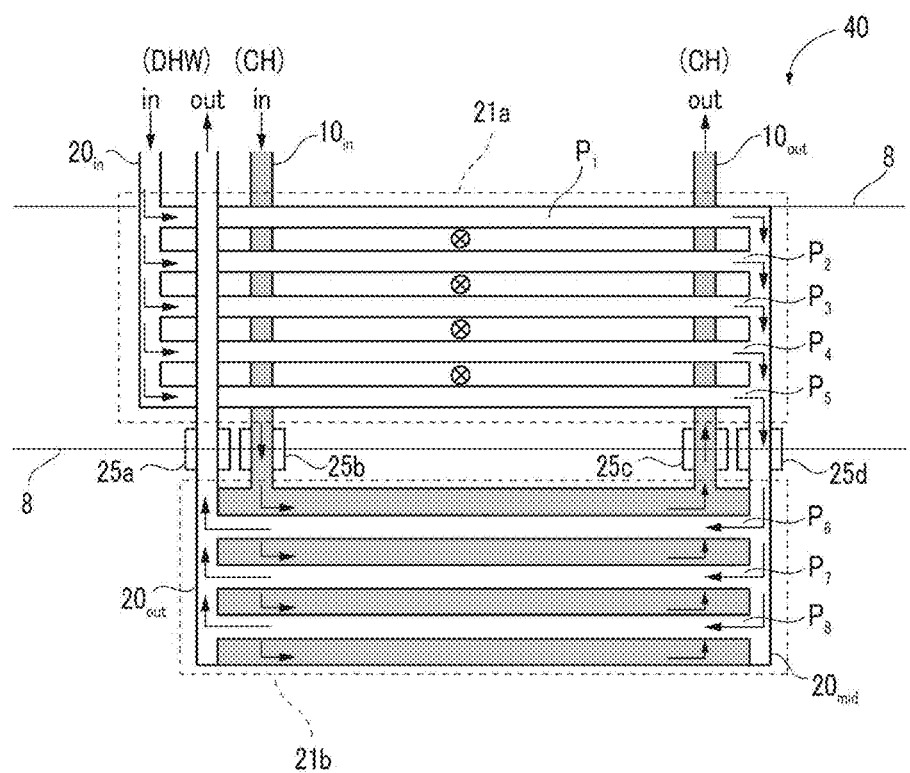
FIG. 3 is an explanatory diagram illustrating the details of a water supply heat exchanger (separate type).

As illustrated in FIG. 3, the heat exchanger for hot water supply 40 is composed of a gas-liquid heat exchanging unit 21a and a liquid-liquid heat exchanging unit 21b. These two heat exchanging units are connected through a topmost hollow plate $P_6$ of the liquid-liquid heat exchanging unit 21b at below a bottommost hollow plate $P_5$ of the gas-liquid heat exchanging unit 21a.

As illustrated also in FIG. 1, the gas-liquid heat exchanging unit 21a, in which the water for hot water supply is preliminarily heated by the heat exchange with the combustion exhaust gas, is housed inside an exhaust passage 8, that is, in the flow passage of a combustion exhaust gas. Providing the exhaust passage 8 with brazable junction sections 25a to 25d enables the liquid-liquid heat exchanging unit 21b to be joined to the outer side of the exhaust passage 8.

At the junction section 25a, the gas-liquid heat exchanging unit 21a and a water passage $20_{out}$ of the liquid-liquid heat exchanging unit 21b are joined. At the junction section 25d, the gas-liquid heat exchanging unit 21a and a water passage $20_{mid}$ of the liquid-liquid heat exchanging unit 21b are joined.

Further, the gas-liquid heat exchanging unit 21a and a water passage $10_{in}$ for heat medium of the liquid-liquid heat exchanging unit 21b are joined at the junction section 25b. The gas-liquid heat exchanging unit 21a and a water passage $10_{out}$ for heat medium of the liquid-liquid heat exchanging unit 21b are joined at the junction section 25c.

Thus, joining the gas-liquid heat exchanging unit 21a and the liquid-liquid heat exchanging unit 21b at the junction sections 25a to 25d enables the position of the liquid-liquid heat exchanging unit 21b to be adjusted by the length of piping. In addition, the gas-liquid heat exchanging unit 21a and the liquid-liquid heat exchanging unit 21b are directly joined without using joining components, so that these two exchanging units 21a and 21b can be combined into one piece in a compact manner.

The embodiments described above are exemplary embodiments of the present invention and a variety of modification examples other than the embodiments are conceivable. For example, the heat medium inlet and the heat medium outlet of the heat medium supply passage 10a and the water inlet and the water outlet of the heat exchanger for hot water supply 21 may be set in any directions insofar as the directions of connection thereof are the same. Further, in FIG. 2A, the directions of circulation of the water for hot water supply and the water for heating of the liquid-liquid heat exchanging unit 21b are opposite from each other; alternatively, however, the directions of circulation may be the same.

In the combined boiler 1, if only hot water is being supplied for, for example, shower, then the three-way valve 15 is controlled such that the water for heating circulates through the first hot water passage 10, which includes the heat medium supply passage 10a.

Meanwhile, if only heating is performed, then the three-way valve 15 is controlled such that the water for heating will not be directed to the heat medium supply passage 10a. At this time, the heat exchange by a heat medium is not performed in the liquid-liquid heat exchanging unit 21b, whereas the combustion exhaust gas of the burner 3 circulates through the gaps among the hollow plates of the gas-liquid heat exchanging unit 21a. This prevents the water for hot water supply that remains in the second hot water passage 20 from being completely cooled.

Further, if both the hot water supply operation and the heating operation are being performed, the water for heating can be distributed by adjusting the degree of opening of the three-way valve 15 according to the amount of heat required for each of the hot water supply operation and the heating operation.

DESCRIPTION OF REFERENCE NUMERALS

1 . . . Combined boiler; 2 . . . Combustion chamber; 3 . . . Burner; 4 . . . Gas supply pipe; 5 . . . Air supply pipe; 5a . . . Mixing section; 6 . . . Fan; 6a . . . Motor; 7 . . . Mixture passage; 8 . . . Exhaust passage; 9 . . . Water passage section; 10 . . . First hot water passage (Heat medium passage); 10a . . . Heat medium supply passage (Heat medium passage); 11 . . . Heat exchanger for heating (Heat medium heat exchanger); 12a, 22a . . . Water supply thermistor; 12b,22b . . . Hot water supply thermistor; 13,23 . . . Flow rate sensor; 14 . . . Pump; 15 . . . Three-way valve; 20 . . . Second hot water passage (Hot water supply passage); 21, 40 . . . Heat exchanger for hot water supply (Hot water supply heat exchanger); 21*a* . . . Gas-liquid heat exchanging unit (First heat exchanging unit); 21*b* . . . Liquid-liquid heat exchanging unit (Second heat exchanging unit); 24 . . . Water volume servo valve; 25*a* to 25*d* . . . Junction sections; 30 . . . Controller; and 31 . . . Remote control.

What is claimed is:

1. A heat source device comprising:
   a burner;
   an exhaust passage through which a combustion exhaust gas of the burner is discharged;
   a heat medium passage through which a heat medium circulates;
   a heat medium heat exchanger which is provided in communication with the heat medium passage in the exhaust passage and which heats the heat medium circulating through the heat medium passage by the combustion exhaust gas of the burner;
   a hot water supply passage through which water circulates in the exhaust passage; and
   a hot water supply heat exchanger which has a first heat exchanging unit, which is provided in communication with the hot water supply passage in the exhaust passage on a downstream side in relation to the heat medium heat exchanger and which heats water circulating through the hot water supply passage by the combustion exhaust gas of the burner, and a second heat exchanging unit, which is provided in communication with the heat medium passage and the hot water supply passage and which heats the water circulating through the hot water supply passage by the heat medium circulating through the heat medium passage, wherein
   the hot water supply heat exchanger has: a plurality of hollow plates having hollow portions inside respectively, and stacked in parallel with predetermined gaps provided thereamong; a first communication section in communication with the hollow portions of the plurality of hollow plates; a second communication section in communication with the hollow portions of a predetermined number of hollow plates from a topmost hollow plate among the plurality of hollow plates; and a third communication section in communication with the hollow portions of hollow plates below the predetermined number of hollow plates among the plurality of hollow plates,
   the first heat exchanging unit is composed of the predetermined number of hollow plates from the topmost hollow plate, the first communication section, and the second communication section,
   the second heat exchanging unit is composed of the hollow plates below the predetermined number of hollow plates, the first communication section, and the third communication section, and
   a part of an outer shell of the exhaust passage is composed of a top surface, a side surface, or a bottom surface of a hollow plate constituting the first heat exchanging unit, and
   the heat medium circulating through the heat medium passage flows into the second heat exchanging unit via the first heat exchanging unit, and flows out from the second heat exchanging unit via the first heat exchanging unit.

2. The heat source device according to claim 1, wherein
   the plurality of hollow plates are rectangular,
   the first communication section is provided on a first side surface side of the plurality of hollow plates, and
   the second communication section and the third communication section are provided on a second side surface side opposing the first side surface.

3. The heat source device according to claim 1, wherein the hollow plates constituting the first heat exchanging unit are placed in the heat source device in a raised manner.

\* \* \* \* \*